United States Patent Office 3,825,546
Patented July 23, 1974

3,825,546
SILICON AND GERMANIUM SUBSTITUTED AZASPIRANES
Leonard M. Rice, Columbia, Md., assignor to Geschickter Fund for Medical Research, Washington, D.C.
No Drawing. Filed Sept. 8, 1971, Ser. No. 178,816
Int. Cl. C07d 29/28
U.S. Cl. 260—293.66                                    15 Claims

ABSTRACT OF THE DISCLOSURE

Novel azaspiranes containing silicon or germanium in a ring, their acid addition and bis-quaternary salts as well as intermediate azaspirodiones. The azaspiranes are particularly useful for their ganglionic blocking activities.

SUMMARY OF THE INVENTION

The present invention relates to novel heterocyclic nitrogen compounds. More specifically, this invention relates to silicon and germanium substituted azaspiranes, to their pharmaceutically acceptable and non-toxic acid addition and bis-quaternary salts, and to a process for the production of intermediate compounds.

The azaspiranes of the present invention are formed from intermediate compounds, azaspirodiones, which are novel in themselves.

It has been discovered that the bis-quaternary salts of these compounds exhibit antihypertensive activity and are particularly useful in blocking ganglionic activity in dogs and other animals.

The novel compounds of this invention may be represented by the following general formula:

$$\begin{array}{c} R^1 \quad CH_2-CH_2 \quad CH_2-(A) \quad\quad R^4 \\ \diagdown X \diagup \quad \diagdown C \diagup \quad \diagdown N-(R^3)_y-N \diagup \\ R^2 \quad CH_2-CH_2 \quad (B)-(A^1)_n \quad\quad R^5 \end{array}$$

(General Formula)

wherein $R^1$ and $R^2$ are the same or different alkyl groups of 1–4, preferably 1–2, carbon atoms
X=silicon or germanium
A and $A^1$ are the same and either $$CH_2 \text{ or } \overset{O}{\underset{}{\overset{\|}{C}}}$$

$n=0$ or 1
B=$CH_2$ when $n$ is one and $$\overset{O}{\underset{}{\overset{\|}{C}}} \text{ or } CH_2$$

when $n$ is zero
$R^3$=alkylene or alkenylene
$y$=2–6, preferably 2–3 when $R^3$ is alkylene and 3–4 when $R^3$ is alkenylene
$R^4$ and $R^5$ are the same or different lower alkyls having 1–4, preferably 1–3, carbon atoms, lower alkenyls having 3–4 carbon atoms, or cyclicized together form a heterocyclic group selected from morpholino, pyrrolidino, piperidino and lower alkyl (1–4 carbon atoms) piperazino in which said lower alkyl is attached to a terminal nitrogen atom.

When "$n$" in the above formula is zero, "A" and "B" will be methylene or carbonyl groups. Also, when "$n$" is one, "B" will be a methylene group, "A" and "$A_1$" will be the same and either carbonyl or methylene groups.

DETAILED DESCRIPTION OF THE INVENTION

Novel azaspirodiones of the present invention in which "$n$" in the above formula is zero may be represented by the formula:

$$\begin{array}{c} R^1 \quad CH_2-CH_2 \quad CH_2-C=O \\ \diagdown X \diagup \quad \diagdown C \diagup \quad \quad\quad R^4 \\ R^2 \quad CH_2-CH_2 \quad C-N-(R^3)_y-N \diagdown \\ \quad\quad\quad\quad\quad\quad\quad \overset{\|}{O} \quad\quad\quad\quad R^5 \end{array}$$

wherein $R^1$, $R^2$, $R^3$, $R^4$, $R^5$, X and $y$ have the same meanings previously indicated.

A convenient starting material used in preparing a preferred embodiment of this invention, as represented by the above formula, may be 4,4-dimethyl-4-sila-cyclohexanone such as disclosed in Benkeser, R. H, and Bennett, E. W., J. Am. Chem. Soc. *80*, page 5415 (1958).

The conversion of 4,4-dimethyl-4-sila-cyclohexanone into an azaspirodione is conveniently carried out by a 4-step reaction.

In the first step of this reaction 4,4-dimethyl-4-sila-cyclohexanone is condensed with a lower alkyl cyanoacetate, for example, ethyl cyanoacetate, to produce 4,4-dimethyl-4-sila-cyclohexylidenecyanoacetate and water. This reaction is carried out in an organic solvent, for example, benzene or toluene, and in the presence of acetic acid and ammonium acetate which act as catalysts. The reaction is carried out, for example, at reflux temperature for time periods ranging from 2 hours to 24 hours.

In the second reaction step the 4,4-dimethyl-4-sila-cyclohexylidenecyanoacetate from the first reaction step is converted to a dinitrile by treatment with potassium cyanide and then hydrolyzed by refluxing with concentrated hydrochloric acid to produce 4,4-dimethyl-4-sila-cyclohexane-1-carboxy-1-acetic acid. The dinitrile reaction may be conveniently carried out in an organic solvent such as ethyl alcohol at reaction temperatures ranging from 20° C.–30° C. and reaction times ranging from 12 hours to 36 hours.

In the third reaction step the carboxylated product of the second reaction step is refluxed with an anhydride such as acetic anhydride to produce the anhydride of the carboxylated product of the second step and acetic acid. This reaction is carried out over time periods ranging from 15 minutes to 4 hours.

In the fourth reaction step the anhydride product from the third reaction step is reacted with dimethylaminopropylamine to produce N-dimethylaminopropyl-8,8-dimethyl-8-sila-2-azaspiro[5:4]decane-1,3-dione and water. This reaction is carried out at temperatures ranging from 150° C. to 200° C. over reaction times ranging from 30 minutes to 2 hours. No solvent need be utilized. The four step reaction may be illustrated as follows:

Step 1:

$$(CH_3)_2Si \diagup\diagdown \begin{array}{c} CH_2-CH_2 \\ CH_2-CH_2 \end{array} \diagdown\diagup C=O + CNCH_2COOC_2H_5 \longrightarrow$$

$$(CH_3)_2Si \diagup\diagdown \begin{array}{c} CH_2-CH_2 \\ CH_2-CH_2 \end{array} \diagdown\diagup C=\overset{CN}{\underset{}{\overset{|}{C}}}-COOC_2H_5 + H_2O$$

(I)

Step 2:

$$(I) \quad + KCN \xrightarrow{HCl}$$

$$(CH_3)_2Si \diagup\diagdown \begin{array}{c} CH_2-CH_2 \\ CH_2-CH_2 \end{array} \diagdown\diagup \overset{CH_2COOH}{\underset{COOH}{\overset{|}{C}}}$$

(II)

Step 3:

(II) + (CH₃CO)₂O ⟶ 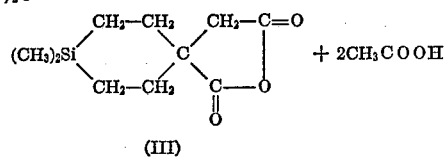 + 2CH₃COOH (III)

Step 4:

(III) + (CH₃)₂N—CH₂—CH₂—CH₂—NH₂ ⟶

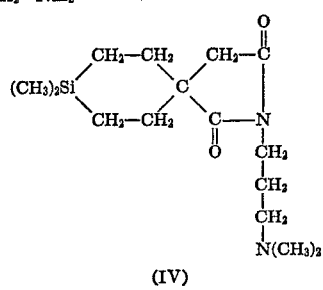

(IV)

The dione product from the above reaction is converted in a fifth reaction step into the final azaspirane product, N-dimethyl-aminopropyl-8,8-dimethyl - 8 - sila-2-azaspiro [5:4]decane, by reacting it with a reducing agent such as lithium aluminum hydride. The reaction is advantageously carried out utilizing anhydrous ether as a solvent and may be illustrated as follows:

Step 5:

(IV) + LiAlH₄ ⟶

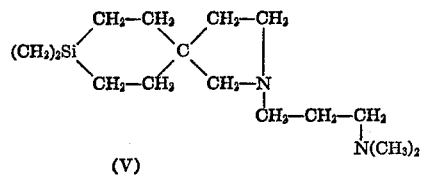

(V)

Azaspirodiones wherein "n" in the above general formula is "1" may be represented by the following formula:

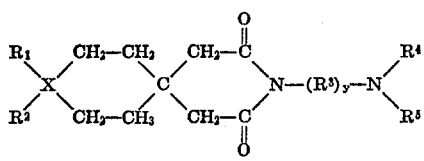

wherein R¹, R², R³, R⁴, R⁵, y and X have the same meanings previously indicated.

The same starting material may be utilized in preparing this embodiment but a five step process is involved in synthesizing the intended azaspirodione.

In the first step 4,4-dimethyl-4-sila-cyclohexanone is reacted with a phosphorus substituted compound having the formula (E)₃P—CH₂—D, wherein E is a lower alkyl of 1–4, preferably 2, carbon atoms and D is COOE or CN. The Wittig reaction is used in this phase of the process. For example, the use of triethylphosphono-acetate in the reaction yields ethyl-4,4-dimethyl-4-sila-cyclohexylidene acetate which is then condensed in the presence of sodium ethoxide with an alkyl (preferably 1–4 carbon atoms) cyanoacetate, for example, ethyl cyanoacetate to produce di-ethyl - 4,4 - dimethyl-4-sila-cyclohexane-1-(cyanoacetate) acetate. This diacetate is then hydrolyzed by refluxing with concentrated hydrochloric acid to produce the corresponding diacetic acid. The diacetic acid is then refluxed with an anhydride and reacted with dimethylaminopropylamine in the same manner as in steps three and four of the previous embodiment to produce N-dimethylaminopropyl-9,9-di-methyl-9-sila-3-azaspiro[5:5]undecane-2,4-dione. This reaction may be illustrated as follows:

Step 1:

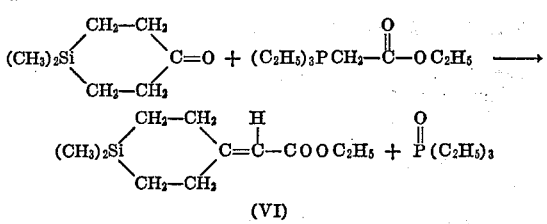

(VI)

Step 2:

(VI) + CNCH₂COOC₂H₅ ⟶

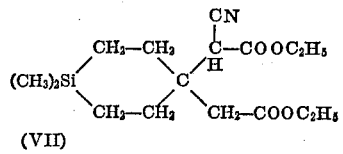

(VII)

Step 3:

(VII) + HCl ⟶ 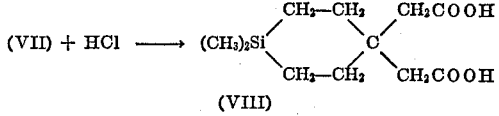

(VIII)

Step 4:

(VIII) + (CH₃CO)₂O ⟶

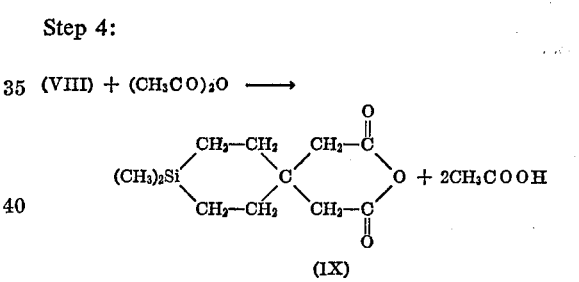 + 2CH₃COOH (IX)

Step 5:

(IX) + (CH₃)₂N—CH₂—CH₂—CH₂—NH₂ ⟶

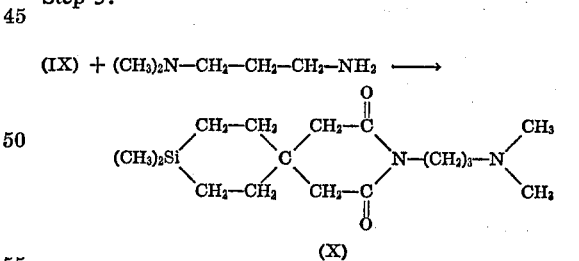

(X)

The dione product of the above reaction is converted in a sixth reaction step into the final azaspirane product, N-dimethylaminopropyl-9,9-dimethyl - 9 - sila-3-azaspiro [5:5]undecane, in the same manner utilized in forming the homologous compound illustrated by V, supra.

The germanium compounds of this invention may be produced by utilizing a dialkyl (1–4 carbon atoms) germane, preferably dimethyl or diethyl germane, as starting material. The dialkyl germane is converted to a dialkyl germanium dipropionic acid ester by condensing it with methyl acrylate and distilling off the reaction products under reduced pressure. The resulting dipropionic acid ester is then cyclicized by treatment with potassium tert-butoxide in an organic solvent solution and subsequent hydrolyzed and decarboxylated by refluxing with 20% sulfuric acid to produce 4,4-dialkyl-4-germa-cyclohexanone. This ketone is then converted to a di-acid in the same manner as outlined for the analogous silicon compound, supra.

The reaction producing the ketone may be illustrated in the following manner:

Step 1:

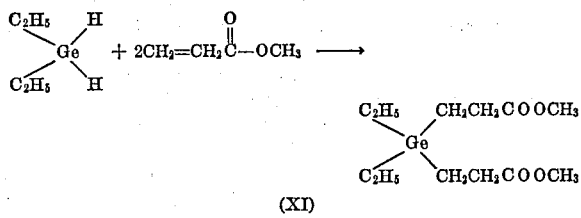

Step 2:

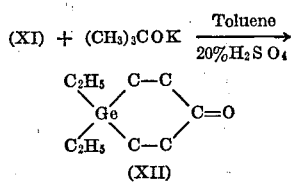

In addition to the novel silicon and germanium containing azaspirodiones and azaspiranes disclosed herein, the present invention contemplates the conversion of the azaspiranes into their pharmaceutically acceptable, non-toxic acid addition and bis-quaternary salts. Such salts of azaspiranes may be represented by the following formula:

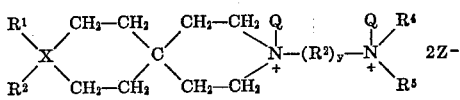

wherein $R^1$, $R^2$, $R^3$, $R^4$, $R^5$, X, y, and n are the same as in the "General Formula" (supra). In all cases Q is either hydrogen, lower alkyl of 1–4 carbon atoms or alkenyl of 3–4 carbon atoms and Z is a non-toxic anion such as iodide, chloride, acetate, bromide, sulfate, perchlorate, mucate, succinate, citrate, phosphate, or the like. In general, those non-toxic salts which are soluble in water or other well tolerated solvents are particularly useful for therapeutic purposes due to the ease of administration of the salts in their dissolved form. However, other non-toxic salts may be used for such purposes also.

The free bases and their acid addition salts produce cytotoxic effects on human tissue cultures of lymphosarcoma, prostate cancer and breast cancer in the range of about 1–5 gamma per ml. of culture or less. Also, as previously indicated the bis-quaternary salts of the free bases have gangliophlegic properties and produce ganglionic blockages in varying degrees of sympathetic and parasympathetic ganglia.

The following examples will further illustrate the invention:

Example I

This example illustrates the formation of N-substituted-8,8-dimethyl-8-sila-2-azaspiro[5:4]decane and specifically identifies intermediate precursor compounds. The azaspirane formed by this process is particularly useful because of its potent cytotoxic properties against tissue cultures of cancerous tissue such as lymphosarcoma, breast cancer and KB culture cells.

(a) The formation of ethyl-4,4-dimethyl-4-sila-cyclohexylidene alpha-cyanoacetate from 4,4 - dimethyl-4-sila-cyclohexanone: A mixture of 28.3 g. (0.2 mole) of 4,4-dimethyl-4-sila-cyclohexanone and 22.6 g. of ethyl cyanoacetate was dissolved in 60 ml. of dry benzene. To this solution was added 1.4 g. of ammonium acetate and 2.4 g. of glacial acetic acid and the mixture refluxed with a Dean-Stark water separator. After the water has ceased to separate the reflux was continued for an additional 2 hours. The mixture was allowed to cool and then washed with three 100 ml. portions of water. The washings were extracted twice with benzene and the combined benzene solutions were dried over anhydrous sodium sulfate. After removing the benzene by distillation the residue was distilled in a vacuum and 37.2 g. of the product was collected at 85–87° C. and 0.075 mm. Hg as a colorless, syrupy liquid.

(b) The formation of ethyl-4,4-dimethyl-4-sila-cyclohexane-1-cyano-1-alpha-cyanoacetate: A solution of 37 g. of ethyl - 4,4 - dimethyl-4-sila-cyclohexylidene-alpha-cyanoacetate, prepared as above, in 136 ml. of absolute alcohol was prepared and a solution of 20 g. of potassium cyanide in 40 ml. of water was added thereto. After 2 days at room temperature the potassium salt of the product separated. The alcohol was removed under diminished pressure and the crude potassium salt was used in the next reaction (c).

(c) The formation of 4,4-dimethyl-4-sila-1-carboxycyclohexane acetic acid: The above crude potassium salt (b) was refluxed with 300 ml. of concentrated hydrochloric acid for 3 days and then diluted with an equal volume of water. After cooling for several hours the mixture was filtered and the precipitate was washed with water. The crude product was dissolved in hot potassium bicarbonate solution, the solution filtered and the filtrate neutralized with hydrochloric acid. The acid solution was filtered, washed with water and dried. After recrystallization from benzene and petroleum ether the acid melted at 161–162° C. and weighed 23.8 g.

(d) The formation of 4,4-dimethyl-4-sila-1-carboxycyclohexane acetic acid anhydride: A mixture of 21.8 g. of 4,4-dimethyl-4-sila-1-carboxycyclohexane acetic acid and 100 ml. of acetic anhydride was refluxed for an hour. The excess acetic anhydride was removed under diminished pressure (20 mm. Hg) and the residue was distilled. The product boiled at 104–110° C. and 0.15 mm. Hg and weighed 16.2 g. It melted at 88–90° C.

(e) The formation of N-dimethylaminopropyl-8,8-dimethyl-8-sila-2-azaspiro[5:4]decane-1,3-dione: To 15.2 g. of 4,4-dimethyl-4-sila-1-carboxycyclohexane acetic acid anhydride was added 7.3 g. of 3-dimethylaminopropylamine and the mixture was heated at 180–200° C. for an hour. The mixture was allowed to cool and the product was obtained by distillation at 118–128° C. at 0.08 mm. Hg. It melted at 88–89.5° C. and weighed 19.6 g.

(f) The formation of N-dimethylaminopropyl-8,8-dimethyl-8-sila-2-azaspiro[5:4]decane: Lithium aluminum hydride (10 g.) and 500 ml. of anhydrous ether were placed in a 1-l., 3-necked flask fitted with a stirrer, dropping funnel and a reflux condenser. After stirring for 2 hours a solution of 15 g. of N-dimethylaminopropyl-8,8-dimethyl-8-sila-2-azaspiro[5:4]-decane-1,3-dione dissolved in 200 ml. of anhydrous ether was added over a period of 30 minutes. The reaction mixture was stirred for 4 hours and then decomposed by the slow, dropwise addition of 40 ml. of water. After stirring an additional hour the inorganic solids were filtered off and the ethereal filtrate dried over anhydrous sodium sulfate. The ether solvent was then removed by distillation. The residue was distilled to provide substantially pure N-dimethylaminopropyl-8,8-dimethyl-8-sila-2-azaspiro[5:4]decane which has a boiling point of 85° C.–90° C. at 0.05 mm. Hg. This compound was tested in human tissue cultures of lymphosarcoma, prostate cancer and breast cancer and displayed cytotoxic activity at 1–5 micrograms per ml. of culture.

(g) The hydrochloride salt of the reaction product of (f) above was prepared by treating the product with an ethyl alcohol solution of hydrogen chloride followed by the precipitation of the salt with ether. After recrystallization the dihydrochloride of (f) melted at 311° C.–312° C.

(h) The methiodide of compound (f) was also prepared in the same manner except methyl iodide was substituted for hydrogen chloride. The dimethiodide of (f) had a melting point of 288° C.–290° C. The dimethiodide of compound (f) above exhibited potent ganglionic blocking activity and produced marked hypotension in hypertensive dogs at very low doses, i.e., 10 mg./kilo (body weight of the dog).

Example II

This example illustrates the formation of N-substituted-9,9-dimethyl-9-sila-3-azaspiro[5:5]undecane which also has potent cytotoxic activity.

(a) The formation of ethyl-4,4-dimethyl-4-sila-cyclohexylidene acetate: A dry 500 ml. 3-necked flask was purged with nitrogen and fitted with a stirrer, condenser, thermometer and funnel. A mixture of 9 g. of sodium hydride (50% in mineral oil) was added to 100 ml. of benzene and stirred while 44.6 g. of triethylphosphonacetate was added dropwise over a half hour period. Dur- the addition the temperature was not allowed to rise above 30° C. After the mixture had been stirred an additional hour at room temperature, 28.3 g. of 4,4-dimethyl-4-silacyclohexanone was slowly added over a 30 minute period while maintaining the temperature under 25° C. The mixture was then heated to 60° C. for 15 minutes and again cooled. The benzene solution was decanted and the residue washed several times with benzene. The benzene was distilled off and the residue distilled under reduced pressure to produce 24.6 g. of ethyl-4,4-dimethyl-4-sila-cyclohexylidene acetate having a boiling point of 52–56° C. at 0.03 mm. Hg.

(b) The formation of diethyl-4,4-dimethyl-4-sila-cyclohexane-1-(alpha-cyanoacetate)-1-acetate: A solution of sodium ethoxide was prepared in a 500 ml. 3-necked flask fitted with a stirrer, funnel and a reflux condenser, by reacting 4.43 g. of sodium with 100 ml. of absolute alcohol. To this refluxing solution 21.8 g. of ethyl cyanoacetate was added slowly and the mixture cooled. 37.4 g. of ethyl-4,4-dimethyl-4-sila-cyclohexylidene acetate was added to the cooled mixture and the resulting solution was refluxed on a steam bath for 2 hours. The reaction mixture was cooled to room temperature and was acidified by dilute hydrochloric acid. The mixture was then diluted with 300 ml. of water and extracted 3 times with ether. After washing the ethereal solution with potassium bicarbonate solution and saturated sodium chloride solution the mixture was dried over anhydrous sodium sulfate. The ether was removed and the residue was distilled giving 20.3 g. of diethyl-4,4-dimethyl-4-sila-cyclohexane-1-(alpha-cyanoacetate)-1-acetate having a boiling point of 132–136° C. at 0.23 mm. Hg. Redistillation gave 16.4 g. of a substantially pure product boiling at 120–124° C. at 0.05 mm. Hg.

(c) The formation of 4,4-dimethyl-4-sila-cyclohexane-1,1-diacetic acid: A solution of 32 g. of diethyl-4,4-dimethyl - 4 - sila-cyclohexane - 1 - (alpha-cyanoacetate)-1-acetate was mixed with 200 ml. of concentrated hydrochloric acid and refluxed for 2 days. The mixture was diluted with 400 ml. of water, cooled, and filtered. The solid material was treated with a saturated solution of potassium bicarbonate, heated and filtered. The alkaline filtrate was acidified with hydrochloric acid and allowed to cool. The precipitate was filtered, dried and recrystallized from ethyl acetate to yield a product having a melting point between 209–212° C.

(d) The formation of 4,4-methyl-4-sila-cyclohexane diacetic acid anhydride: A mixture of 10 g. 4,4-dimethyl-4-sila-cyclohexane-1,1-diacetic acid and 50 ml. of acetic anhydride were refluxed for 1 hour. The excess acetic anhydride was distilled off under diminished pressure and residue was sublimed at 65–67° C. under a pressure of 0.05 mm. Hg. 8.8 g. of white crystalline product was obtained having a melting point of 102–104° C. Recrystallization from ethyl acetate and petroleum ether raised the melting point of the material to 104–105° C.

(e) The formation of N-dimethylaminopropyl-9,9-dimethyl - 9 - sila-3-acaspiro[5:5]undecane-2,4-dione: To 8 g. of powdered 4,4-dimethyl-4-sila-cyclohexane-1,1-diacetic acid anhydride was added 4 g. of 3-dimethylaminopropylamine. The mixture was then warmed until a clear melt was obtained. The mixture was heated at 180° C. for 1 hour to complete the cyclization and the water formed in the reaction was removed. After allowing to cool, 7.4 g. of the product was distilled in a vacuum yielding a material having a boiling point of 139–145° C. at 0.08 mm. Hg.

(f) The formation of N-dimethylaminopropyl-9,9-dimethyl-9-sila-3-azaspiro[5:5]undecane: To a solution of 8 g. of lithium aluminum hydride dissolved in 300 ml. of anhydrous ether was added slowly a solution of 6 g. of the above dione (e) dissolved in 100 ml. of anhydrous ether. After stirring and refluxing for 2 hours, the mixture was allowed to cool to room temperature and decomposed by the slow dropwise addition of 32 ml. of water. The mixture was stirred an additional hour, filtered and the filtrate dried over anhydrous sodium sulfate. After removal of the ether 4.8 g. of a colorless liquid was distilled at 102–106° C. at 0.1 mm. Hg.

(g) The dihydrochloride of reaction product (f) was prepared as in Example I(g) and melted at 311–313° C. The bismethiodide was also prepared as in Example I(g) and melted at 290° C. with decomposition.

Example III

This example illustrates the synthesis of the germanium substituted azaspirane, N-dimethylaminopropyl-8,8-diethyl-8-germa-2-azaspiro[5:4]decane.

(a) The formation of diethyl-di(carbomethyoxy-2-ethyl) germanium: A steel bomb was charged with 50.6 g. of diethyl germane and 65.4 g. of methyl acrylate. The mixture was then heated for 5 hours at 100° C. and allowed to cool to room temperature overnight. The contents of the bomb were distilled under reduced pressure and gave the following fractions (1) 15.8 g. boiling point at 3 mm. under 80° C.
(2) 15.7 g. boiling point at 0.035 mm. under 110° C.
(3) 25 g. of residue Fraction (1) proved to be mono-(carbo-methoxy-2-ethyl) germane. Fraction (2) was the desired product and was redistilled yielding a material having a boiling point of 80–82° C. at 0.035 mm. Hg and 87–90° C. at 0.09 mm. Hg. Fraction (3) contained additional reaction products and polymers.

(b) The formation of 2-carbomethoxy-4,4-diethyl-4-germa-cyclohexanone: A solution of 12 g. of potassium tert-butoxide in 500 ml. of dry toluene was prepared in a 1-l. flask. While a stream of nitrogen was passed over the solution it was brought to reflux with stirring. 25.9 g. of diethyl-di(carbomethoxy-2-ethyl) germanium was then added dropwise over 30 minutes and, after refluxing 2 hours, the yellow color changed to a brownish pink. The clear solution was allowed to cool with stirring overnight. The cooled mixture was neutralized with 5% hydrochloric acid and washed twice with water. After drying the solution over sodium sulfate the toluene was distilled off. Vacuum distillation of the residue gave 13.8 g. of the keto ester having a boiling point of 90° C.–94° C. at 0.42 mm. Hg. The keto ester gave a blue positive enol test with alcoholic ferric chloride.

(c) The formation of 4,4-diethyl-4-germa-cyclohexanone: To 23 g. of 2-carbomethoxy-4,4-diethyl-4-germa-cyclohexanone in a 300 ml. flask, fitted with a magnetic stirrer, was added 150 ml. of 20% sulfuric acid. The mixture was refluxed with stirring for 8 hours and allowed to cool. After diluting with an equal volume of water the ketone was extracted 3 times with 100 ml. portions of ether. The ethereal solution was washed twice with water, once with a saturated sodium bicarbonate solution and again with water. The solution was then dried over anhydrous sodium sulfate. After removal of the ether portion the residue was distilled giving 12 g. of the intermediate product having a boiling point of 84° C.–85° C. at 1.5 mm. Hg.

(d) The formation of ethyl-alpha-cyano-alpha(4,4-diethyl-4-germa-cyclohexylidene) acetate: A mixture of 14.2 g of 4,4-diethyl-4-germa-cyclohexanone, 6.8 g. of ethyl cyanoacetate, 0.46 g. of ammonium acetate and 0.72 g. of acetic acid with 100 ml. of benzene was refluxed with a Dean-Stark water separator. When no more water was collected the mixture was cooled and washed with three 30 ml. portions of water. The water washings were again washed with benzene and the combined benzene solutions were dried over sodium sulfate. After removal of the benzene, by distillation, the residue was distilled to give 14 g. of oil which boiled at 126° C.–127° C. at 0.3 mm. and 113° C.–118° C. at 0.05 mm. Hg.

(e) The formation of 4,4-diethyl-4-germa-cyclohexane-1-carboxy-1-acetic acid: A solution of 20.6 g. of potassium cyanide dissolved in 60 ml. of water was added to a solution of 20.6 g. of ethyl-alpha-cyano-alpha-(4,4-diethyl-4-germa-cyclohexylidene) acetate dissolved in 160 ml. of absolute alcohol. After standing at room temperature for 24 hours the solvent was removed and the residue was refluxed with 200 ml. of hydrochloric acid for 24 hours. The mixture was then diluted with 200 ml. of water and extracted with ether. The ether was removed and the oily residue was dissolved in sodium bicarbonate and precipitated with hydrochloric acid. The oily acid was refrigerated and when solid, the liquid was decanted off. The crude product was washed with ice water and then dried giving a yield of 10.2 g. Upon recrystallization from ethyl acetate, petroleum ether and then isooctane the product exhibited a melting point of 111–112° C.

(f) The formation of 4,4-diethyl-4-germa cyclohexane-1-carboxy-1-acetic anhydride: 10 g. of the above acid (e) was refluxed with 40 g. of acetic anhydride for 1 hour. After cooling, the excess acetic anhydride was distilled off at 20 mm. Hg pressure. The residue on distillation boiled at 126–130° C. at 0.2 mm. Hg and solidified to a material having a melting point of 58–59° C.

(g) The formation of N-(3-dimethylaminopropyl)-8,8-diethyl-8-germa - 2 - azaspiro[5:4]decane-1,3-dione: To 6.8 g. of the finely powdered anhydride (f), above, was added 2.4 g. of dimethylaminopropylamine. The mixture was heated to a homogeneous melt at 180° C. until water ceased to be evolved. The product was vacuum distilled and 7.2 g. boiled off at 158° C.–160° C. at 0.22 mm. Hg.

(h) The formation of N-(3-dimethylaminopropyl)-8,8-diethyl - 8 - germa - 2 - azaspiro[5:4]decane: 5 g. of lithium aluminum hydride and 500 ml. of anhydrous ether were placed in a 1-l., 3-necked flask fitted with a stirrer, dropping funnel and a reflux condensor. After stirring for 2 hours a solution of 7 g. of N-(3-dimethylaminopropyl)-8,8 - diethyl - 8 - germa - 2 - azaspiro[5:4]decane-1,3-dione dissolved in 100 ml. of a benzene ether solution was added over a period of 30 minutes. The reaction mixture was stirred for 4 hours and then decomposed by the slow dropwise addition of 20 ml. of water. After stirring an additional hour the inorganic solids were filtered off and the ethereal filtrate dried over anhydrous sodium sulfate. The ether solvent was then removed by distillation. The residue was distilled in vacuum to provide 5.4 g. substantially pure N - (3 - dimethylaminopropyl - 8,8 - dimethyl-8 - germa - 2 - azaspiro[5:4]decane which has a boiling point of 106° C.–109° C. at 0.03 mm. Hg. This compound was tested in human tissue cultures of lymphosarcoma, prostate cancer and breast cancer and displayed cytotoxic activity at 1–5 micrograms per ml. of culture.

(i) The dihydrochloride of (h) above was prepared in the same manner as in Example I(g) and melted at 287° C.–288° C.

Examples of other compounds of the present invention include N-dimethylaminopropyl - 9,9 - dimethyl-9-germa-3 - azaspiro[5:5]undecane - 2,4 - dione, N-diethylaminoethyl - 8,8 - dimethyl - 8 - sila - 2 - azaspiro[5:4]decane, N-piperidinoethyl - 9 - methyl - 9 - ethyl - 9 - sila-3-azaspiro[5:5]undecane, N - diallylaminobutene - 2 - (9,9-diethyl - 9 - sila) - 2 - azaspiro[5:5]undecane, N-pyrrolidinopropyl - 8,8 - diethyl - 8 - sila - 2 - azaspiro[5:4] decane, N - diethylaminopropyl - 9,9 - diethyl - 9 - germa-3 - azaspiro[5:5]undecane, N-diallylaminobutyl - 8,8 - diethyl - 8 - germa - 2 - azaspiro[5:4]decane and N-dimethylaminoethyl - 8,8 - diethyl - 8 - germa - 2 - azaspiro[5:4]decane.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A compound having the structural formula:

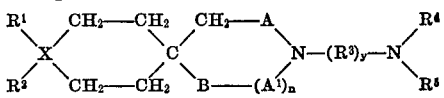

wherein $R^1$ and $R^2$ are the same or different alkyl groups of 1–4 carbon atoms X=silicon or germanium A and $A^1$ are the same and either

$n$=0 or 1

B=$CH_2$ when $n$ is one and B is the same as A when $n$ is zero $R^3$=alkylene or alkenylene $y$=2–6 when $R^3$ is alkylene and 3–4 when $R^3$ is alkenylene $R^4$ and $R^5$ are the same or different lower alkyls having 1–4 carbon atoms, lower alkenyls having 3–4 carbon atoms, or cyclicized together form a heterocyclic group selected from morpholino, pyrrolidino, piperidino and lower alkyl (1–4 carbon atoms) piperazino in which said lower alkyl is attached to a terminal nitrogen atom.

2. N - dimethylaminopropyl - 8,8 - dimethyl - 8 - sila-2-azaspiro[5:4]decane-1,3-dione.

3. N-dimethylaminopropyl - 8,8 - dimethyl - 8 - sila-2-azaspiro[5:4]decane.

4. N - dimethylaminopropyl - 9,9 - dimethyl - 9 - sila-3-azaspiro[5:5]undecane-2,4-dione.

5. N - dimethylaminopropyl - 9,9 - dimethyl - 9 - sila-3-azaspiro[5:5]undecane.

6. N - dimethylaminopropyl - 8,8 - dimethyl - 8 - germa-2-azaspiro[5:4]decane-1,3-dione.

7. N - dimethylaminopropyl - 8,8 - dimethyl - 8 - germa-2-azaspiro[5:4]decane.

8. A compound having the structural formula:

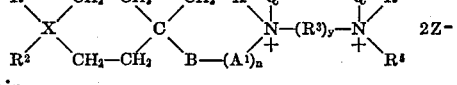

wherein $R^1$ and $R^2$ are the same or different alkyl groups of 1–4 carbon atoms X=silicon or germanium A and $A^1$ are the same and either

$n$=0 or 1

B=$CH_2$ when $n$ is one and B is the same as A when $n$ is zero $R^3$=alkylene or alkenylene $y$=2–6 when $R^3$ is alkylene and 3–4 when $R^3$ is alkenylene $R^4$ and $R^5$ are the same or different lower alkyls having 1–4 carbon atoms, lower alkenyls having 3–4 carbon atoms, or cyclicized together form a heterocyclic group selected from morpholino, pyrrolidino, piperidino and lower alkyl (1–4 carbon atoms) piperazino in which said lower alkyl is attached to a terminal nitrogen atom Q=hydrogen, lower alkyl of 1–4 carbon atoms or alkenyl of 3–4 carbon atoms, and Z=a non-toxic, pharmaceutically acceptable anion.

9. A process for forming a diacid compound of the formula:

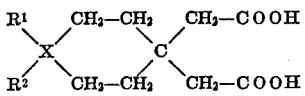

wherein $R^1$ and $R^2$ are the same or different alkyl groups of 1–4 carbon atoms, and X is silicon or germanium, which comprises reacting a compound of the formula:

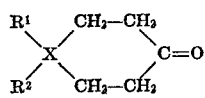

wherein X, $R^1$ and $R^2$ are the same as above, with a compound of the formula $(E)_3$—P—$CH_2$—D wherein E is a lower alkyl of 1–4 carbon atoms and D is COOE or CN to form a compound of the formula:

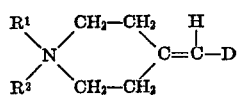

wherein $R^1$, $R^2$, D, and X are the same as above, reacting said last mentioned compound with an alkyl cyanoacetate to form an addition product having the formula:

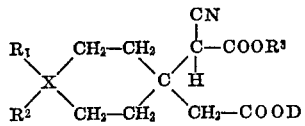

wherein $R^1$, $R^2$, X, and D are the same as above and $R^3$ is an alkyl group and hydrolyzing said last mentioned compound to form said diacid compound.

10. N-dimethylaminopropyl - 8,8 - diethyl - 8-germa-2-azaspiro[5:4]decane-1,3-dione.

11. N - dimethylaminopropyl - 8,8 - diethyl-8-germa-2-azaspiro[5:4]decane.

12. A process for producing a compound of the formula

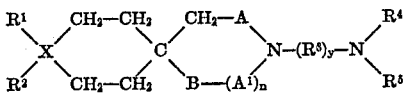

wherein:

$R^1$ and $R^2$ are the same or different alkyl groups of 1–4 carbon atoms
X=silicon or germanium
A and $A^1$ and B are $CH_2$
n=0 or 1
$R^3$=alkylene or alkenylene
y=2–6 when $R^3$ is alkylene and 3–4 when $R^3$ is alkenylene
$R^4$ and $R^5$ are the same or different lower alkyls having 1–4 carbon atoms, lower alkenyls having 3–4 carbon atoms, or cyclicized together form a heterocyclic group selected from morpholino, pyrrolidino, piperidino and lower alkyl (1–4 carbon atoms) piperazino in which said lower alkyl is attached to a terminal nitrogen atom, characterized by subjecting to reducing conditions the corresponding compound in which A and B are each

when n=0, and A and $A^1$ are each

when n=1.

13. A process for producing a compound of the formula

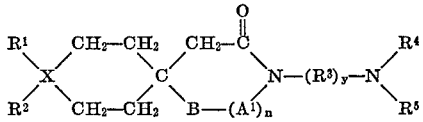

wherein:

$R^1$ and $R^2$ are the same or different alkyl groups of 1–4 carbon atoms
X=silicon or germanium
n=0 or 1
$A^1$=

when n=1
B=

when n=0 and $CH_2$ when n=1
$R^3$=alkylene or alkenylene
y=2–6 when $R^3$ is alkylene and 3–4 when $R^3$ is alkenylene
$R^4$ and $R^5$ are the same or different lower alkyls having 1–4 carbon atoms, lower alkenyls having 3–4 carbon atoms, or cyclicized together form a heterocyclic group selected from morpholino, pyrrolidino, piperidino and lower alkyl (1–4 carbon atoms) piperazino in which said lower alkyl is attached to a terminal atom, by contacting the corresponding compound of the formula

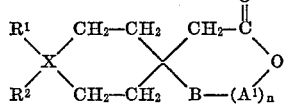

with a corresponding compound of the formula

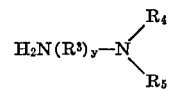

14. The process of claim 12 in which
$R^1$ and $R^2$ are methyl or ethyl
X is germanium
n=0
$R^3$=alkylene
y=2 or 3
$R^4$ and $R^5$ are lower alkyls of 1–3 carbon atoms.

15. The process of claim 13 in which
$R^1$ and $R^2$ are methyl or ethyl
X is germanium
n=0
$R^3$=alkylene
y=2 or 3
$R^4$ and $R^5$ are lower alkyls of 1–3 carbon atoms.

References Cited

Burger, Medicinal Chemistry, 2nd Ed., pages 509–513, Interscience Publishers (N.Y.) (1960).

JOHN D. RANDOLPH, Primary Examiner

U.S. Cl. X.R.

260—240 R, 247.5 R, 268 BC, 281, 343.6, 429 R, 448.2 B; 424—248, 250, 268